INVENTORS
AMNON BROSH &
DOUGLAS N. LAPP
BY Edward M Harrell
ATTORNEY

INVENTORS
AMNON BROSH &
DOUGLAS N. LAPP
BY Edward M. Farrell
ATTORNEY

June 18, 1963

A. BROSH ETAL 3,094,682

CONTROL SYSTEM

Filed April 15, 1957

INVENTORS
AMNON BROSH &
DOUGLAS N. LAPP
BY Edward M. Farrell
ATTORNEY 3,094,682
CONTROL SYSTEM
Amnon Brosh, Philadelphia, Pa., and Douglas N. Lapp, Woodbury, N.J., assignors, by mesne assignments, to Radiation Service Company, a corporation of Florida
Filed Apr. 15, 1957, Ser. No. 652,912
1 Claim. (Cl. 340—22)

This invention relates to control systems, and more particularly to control systems for operating an indicating sign.

In a patent of L. P. Clark, entitled, "Highway Condition Indicating System," Patent No. 2,849,701 and assigned to the same assignee as the present invention, there is described a highway condition indicating system. In the co-pending application, a sensing sign having various indications relating to road conditions was associated with a plurality of pickups or transducers. The indications on the sign were adapted to be changed in accordance with electrical signals at the pickups. These electrical signals corresponded to the road conditions and reflected such conditions as ice, snow, rain and other conditions affecting vehicle travel along a highway. It was indicated in this co-pending application that, in some cases, it would be desirable to operate a road condition sign directly by radio signals instead of by electrical signals from a plurality of pickups.

It is an object of this invention to provide an improved remote control system.

It is a further object of this invention to provide an improved system for remotely controlling the operation of a road condition indicating sign.

In accordance with the present invention, there is provided a plurality of road condition or other type of indicating signs in a system. Means are associated with a tone generator to produce a coded signal for selection of a particular sign and for controlling a particular function associated with the selected sign. The coded signal is applied to a transmitter and transmitted to receivers associated with the indicating signs. When the transmitted signal is received, the coded signal is abstracted from the radio frequency signal and the selected station responsive to a particular coded signal is made responsive to subsequent coded signals which are utilized to control the operation of the indicating sign to reflect various conditions associated with a highway or to display various types of information.

Other objects and advantages of the present invention will be apparent and suggest themselves to those skilled in the art to which the present invention relates, from a reading of the following specification and claims in conjunction with the accompanying drawings, in which:

Figure 1:
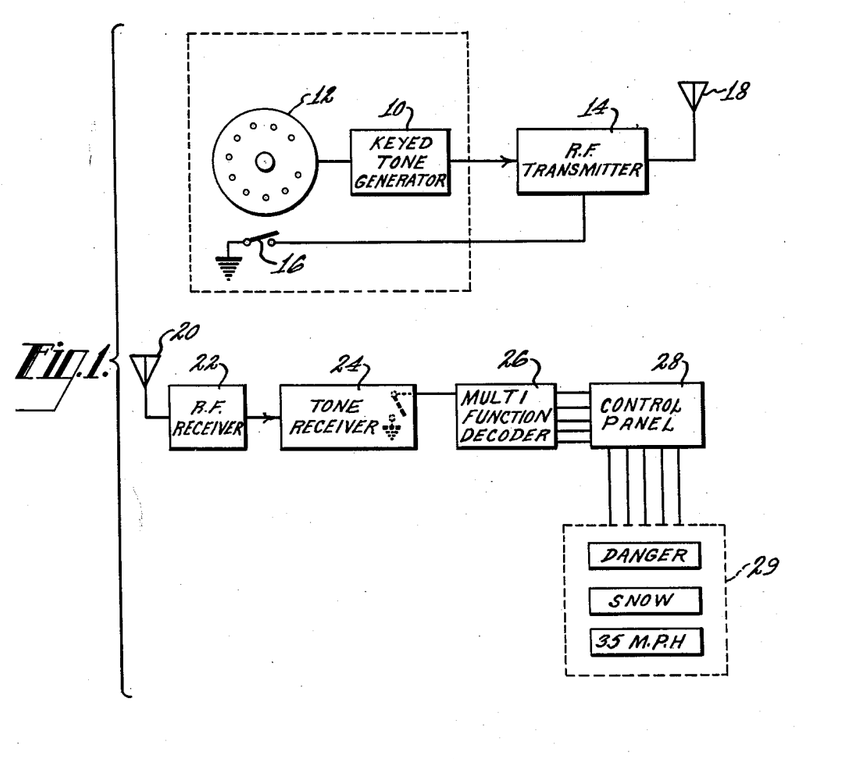
FIGURE 1 is a block diagram of a system embodying the present invention.

Referring particularly to FIGURE 1, a tone generator 10 is adapted to be keyed by a dial 12. A coded tone, dependent upon the digit dialed, is applied from the tone generator 10 to modulate a radio frequency transmitter 14. When a switch 16 is closed, a circuit is returned to ground to permit operation of the transmitter 14. During operation, a radio frequency signal modulated by the dialed coded signal is applied from the radio frequency transmitter 14 to an antenna 18 for transmission to a receiving station.

At the receiving station, the transmitted coded signal is received by an antenna 20 and applied to a radio frequency receiver 22. The output signal from the receiver 22 is applied to a tone receiver 24, which abstracts the dialed coded tone from the radio frequency signal. The coded tone is then applied to a multi-function decoder 26. The decoded signals are then applied to a control panel 28, into which converts the decoded signals into various functions which control the operation of an indicating sign 29. Various indications on the sign are adapted to be changed dependent upon the nature of the function applied thereto.

In one form of the present invention, the transmitting station may be included in a mobile unit, such as a touring police car on a highway. An operator in the mobile unit may change the indications on the sign 29 so as to indicate an accident ahead, a dangerous road condition or to provide other information for oncoming motorists. When the operator desires to change the indications on the sign 29, he first closes the switch 16 causing the transmitter 14 to become operative. He then dials one or more digits. In some cases, it may be necessary to select a particular one of a plurality of signs. In this case, the first digits dialed may determine which of a plurality of signs is to be actuated if more than one sign, such as the sign 29, is included in the system. Having chosen the desired sign, the subsequent digits dialed will result in operation of the chosen sign to display the desired indications in accordance with the digits dialed.

If only one sign is involved, or if all signs in a system are to be actuated in a similar manner, no selection is required and the first digit or digits dialed may be used to control the functions necessary to directly operate the sign or signs.

Figure 2:
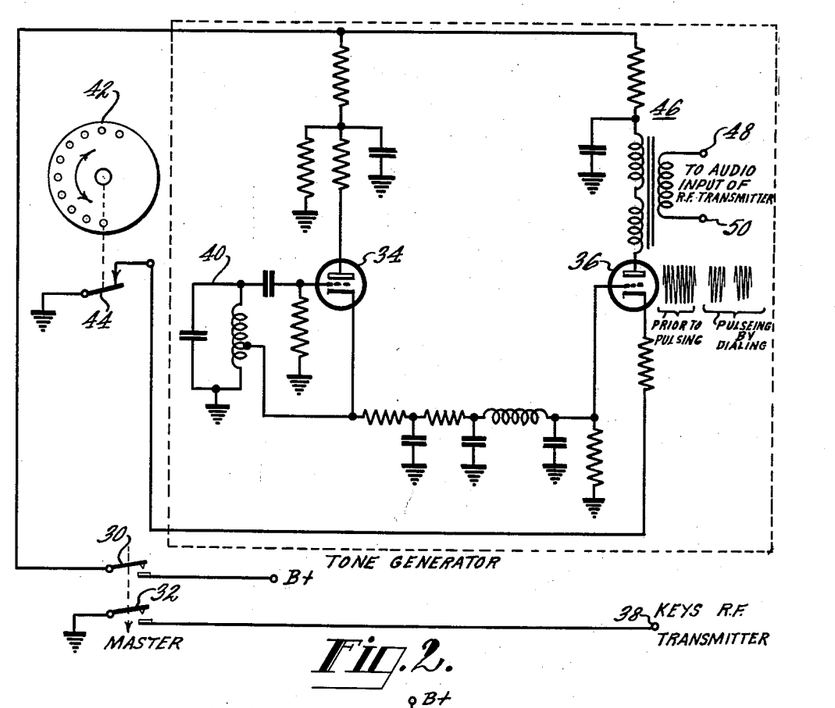
FIGURE 2 is a schematic diagram illustrating a type of tone generator and keyer which may be employed in the present invention.

Referring particularly to FIGURE 2, a type of tone generator, such as may be included in the block 10 of FIGURE 1, is illustrated. A switch including a pair of movable arms 30 and 32 is provided to connect a source of operating potential to the tone generator and to complete a ground connection to permit operation of a radio frequency transmitter. When the switch is closed, as by lifting a mouthpiece or by other manual means, the source of operating potential designated as B+ is applied to electron tubes 34 and 36 through the arm 30. The closing of the arm 32 provides the ground connection for operation of a radio frequency transmitter which may be connected to a terminal 38.

The circuit for generating a desired tone is associated with the electron tube 34 and comprises a Hartley type oscillator. The frequency of the oscillator or tone generator, is determined by a tuned circuit 40. The circuit associated with the electron discharge device 36 may be a conventional audio frequency amplifier for amplifying the tone generated by the oscillator. A dial 42 includes a switch 44 which is connected in the cathode circuit of the electron discharge device 36. When a digit is dialed, the switch 44 is opened a number of times dependent upon the number of the digit dialed. When the switch 44 is closed, the cathode circuit of the electron discharge device 36 is completed to permit current flow in device 36 which permits normal amplification of the tone from the electron discharge device 34. The amplified signal is applied to the transformer 46 in the output circuit of the electron discharge device 36. When switch 44 is opened by the dialing, the device 36 is cut off and the tone signal at the output transformer 44 ceases. The coded signal is then applied to a radio frequency transmitter from the transformer 46 through a pair of output terminals 48 and 50. The coded signal may then be used to modulate the radio frequency transmitter, as will be seen.

Other means for producing a tone, other than the circuit shown may be employed in carrying out the present invention. In some cases, the generated coded tone signal may be directly transmitted to a receiver at an indicating sign instead of utilizing the coded signal to modulate a carrier signal at a transmitter. Vibrating reeds or supersonic mechanical devices may, in some cases, be employed to produce the desired tones or coded signals.

Figure 3:
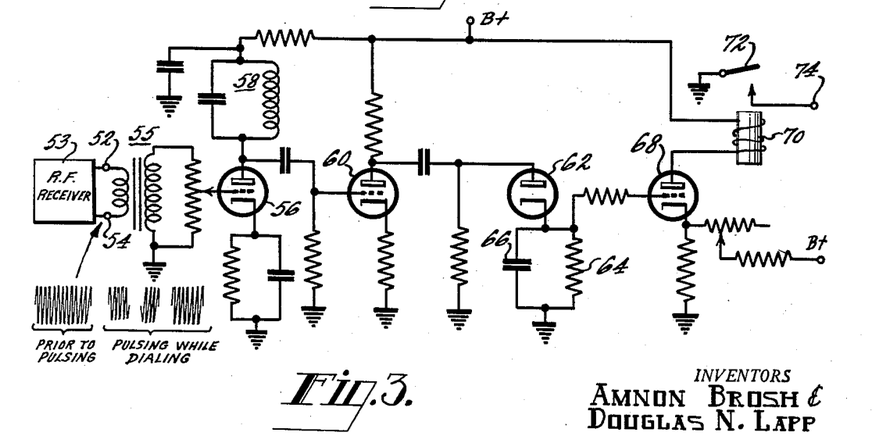
FIGURE 3 is a simplified schematic diagram illustrating a type of tone receiver which may be employed in practicing the present invention.

Referring particularly to FIGURE 3, a simplified tone receiver is shown. The output from a radio frequency receiver, illustrated by a block 53, is supplied to a pair of input terminals 52 and 54. A complete radio frequency receiver is not shown in detail since numerous types of such receivers may be used and are well-known to those skilled in the art. Such a radio receiver may include suitable means for de-modulating or detecting the coded signal from the transmitted modulated carrier signal. The coded signal is applied to an amplifier device 56 through a transformer 55. A tuned circuit 58 in the anode circuit of the amplifier 56 is the frequency determining element and in some cases may comprise the means for selecting one of a plurality of tone signals. The output signal from the amplifier device 56 is applied to a second amplifier device 60. The output signal from the amplifier device 60 is rectified by a diode 62. The rectified output voltage developed across a resistor 64 and a capacitor 66 in the cathode circuit of the diode is a pulsing positive voltage which is applied to the control grid of an electron discharge device 68.

The electron discharge device 68 is normally biased to a non-conducting state by a positive voltage from a B+ source applied to its cathode through a resistor network. During transmission of a tone signal, a positive voltage is applied to its control grid from the resistor 64, the electron discharge device 68 becomes conducting. Current flows through a winding 70 causing a movable arm 72 to close a contact leading to a terminal 74. During the dialing pulse intervals, no voltage is developed across the resistor 64 and the device 68 is non-conducting. It is seen that the movable arm 72 will open in pulses when a coded signal is applied to the control grid of the device 68. The terminal 74 is therefore disconnected from ground periodically in accordance with the pulse or dialed signals. A multi-function decoder to be described may be connected to the terminal 74.

The type of tone receiver employed with the present invention will be dependent to a great extent upon the type of transmission employed. The receiver may take the form of an electro-mechanical device or transducer for receiving a supersonic tone signal, for example.

In the system described to illustrate various features of the present invention, it will be assumed that there are a number of indicating signs and that it is desired to change the indications on one of the signs. In such an arrangement, each of the signs within the system may be assigned a certain code number. If a particular code number is dialed, the indicating sign associated with the dialed code number is made responsive, through appropriate circuitry, to subsequent coded signals which may control the functions which cause the indications on the selected sign to change. If a particular code number is dialed, the signs not corresponding to the code number will not be responsive and the coded signals transmitted to change the indications on the sign will be uneffective. The unaffected signs will not vary but will maintain the same indications as before the transmission.

In a system requiring the selection of a particular indicating signal, it is generally first necessary to disengage the circuitry which is maintaining the previous indications on the sign and adapt appropriate circuitry to receive new information which will cause the indications on the sign to change in accordance with a coded signal received.

Figure 4:
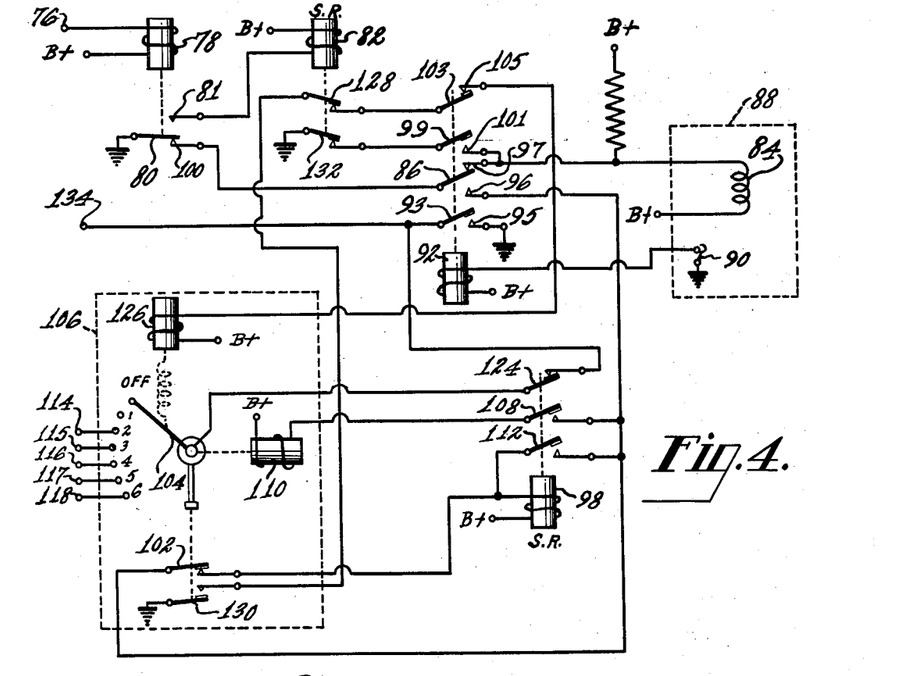
FIGURE 4 is a schematic diagram illustrating a type of decoder which may be employed in practicing the present invention.

Referring particularly to FIGURE 4, the circuit means for selection of a certain sign is first described. A terminal 76, which may be connected to the terminal 74, shown in FIGURE 3, is connected to one end of the coil 78, while the other end is connected to B+. When the terminal 76 is periodically returned to ground, current is caused to flow in a relay 78. The current through the relay 78 is in the form of pulses in accordance with a digit dialed at the transmitter and received by the receiver in a system. When the relay 78 is operated, the contact arm 80 provides ground for a relay 82 through the contact 81 causing the relay 82 to be connected to B+ and become energized. The relay 82 may be of the slow release type.

The relay 78 is adapted to follow the dialed tone at a transmitter. When the relay 78 releases, such as in between tones or during the coded signal period, the contact arm 80 supplies a ground return to a coil 84 through contact arm 86. A source of B+ potential is applied directly to the coil 84. The coil 84 may be included within a selection unit 88. Operation of the selection unit 88 depends upon the reception of a proper code signal transmitted to select a particular station or sign. The selection unit 88 may be of various types and may include mechanical devices or electrical circuitry. An electrical circuit which may comprise the selection unit 88 is described in detail in connection with FIGURE 7. A mechanical unit which may be employed as the selecting unit is shown and described in a patent issued to H. A. Stickel, 2,595,614, issued May 6, 1952. The unit 88 is adapted to follow the signal dialed at the transmitter. If a coded three digit "selection" signal, for example, is one for which the selection unit 88 is adapted to respond, at the completion of the third digit the contact 90 closes. If the coded "selection" signal is not the one to which the selection unit 88 is set, the contact 90 will not close. When the contact 90 is not closed, subsequent coded signals, transmitted to change indications on a sign, will not affect the operation of the sign. Indications on the signs not selected will, therefore, remain unchanged.

When the contact 90 closes, as when a particular sign or station has been "selected," a ground return is provided for B+ through the coil of a relay 92 to cause the relay to become operative. Operation of the relay 92 causes a contact arm 93 to close with a contact 95, the contact arm 86 to close with a contact 96 and away from a contact 97, a contact arm 99 to close with contact 101, and a contact arm 103 to move away from a contact 105.

When a particular sign or station has been selected, the circuit associated with the selected sign is ready to receive the coded signal to change the sign indications. When the next dialed digit relating to the function which is to be controlled is received, it is connected from contact arm 86 to a contact 96, since the relay 92 is in an operative condition. A relay 98, which may be of the slow release type is operated by the application of B+ to one side and ground to the other side through the relay contacts 102, 96, the contact arm 86, contact 100, the contact arm 80 and ground. Contact 102 is closed when the arm 104 of a stepping relay 106 (within a dotted box) in its off position, as indicated.

When a contact 108 arm is closed due to the operation of the relay 98, a path is provided to pulse a relay 110. This path is through the contacts 108, 96, 86, 94, 100 and the contact arm 80 to ground. The relay 110 may be considered as a stepping coil and causes the movable arm 104 to move as many steps as the digit dialed at the transmitter. The relay 110 may be considered as a stepping coil and causes the movable arm 104 to move as many steps as the digit dialed at the transmitter. The relay 98 is maintained operative by the B+ supplied to its coil on one side and a ground return connected on the other side through a contact 112. Since the relay 98 is of a slow release type, the relay does not de-energize until the pulses relating to the last dialed digit ceases. The contact arm 102 is open after the arm 104 leaves the "off" position. When the pulsing cycle is completed, the relay 98 releases since there is no ground return for the source of B+.

When the dialing operation ceases the movable arm 104 is positioned to be electrically connected to one of the contacts numbered from 114 to 118, depending upon the number dialed last. The contacts 114 and 118 may be connected to a control unit which includes circuitry for changing sign indications, as will be described in connection with FIGURE 5. When the arm 104 stops on a particular contact and the relay 98 has released, the particular contact engaged will be connected to ground through the arm 104 and the contact arms 124, 93 and contact 95. The particular contact upon which the arm 104 stops affects the operation of control circuitry as will be described in connection with FIGURE 5.

When the tone from the transmitter ceases, such as by an opening of a switch 16 shown in FIGURE 1, or a switch 32 shown in FIGURE 2, for example, the relay 78 is de-energized. After a short delay, the relay 82 is de-energized since ground is removed from the contact arm 81. A contact 132 is closed to supply a ground path through the contact arm 99, which is closed on 101, to the coil 84 of the selecting unit 88 to release and contact 90 to open. When the contact 90 opens, the relay 92 becomes inoperative. A ground is then provided for a release coil 126 through contact 105, contact arm 103, 128 and 130, the contact arm 130 being closed when the arm 104 is not in its "off" position. Operation of the release coil 126 causes the arm 104 to drop back to its "off" position. This completes the dialing operation, and the system is ready for the next dialing operation.

Figure 5:
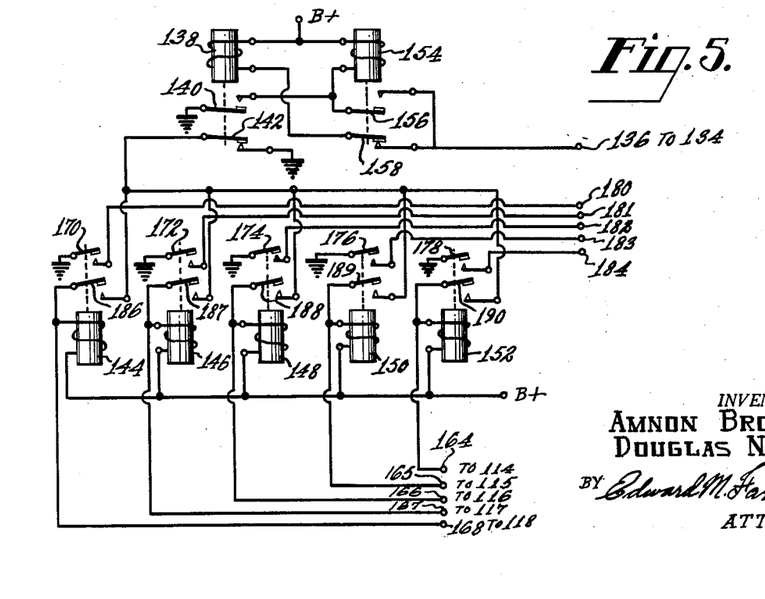
FIGURE 5 is a schematic diagram illustrating a type of a control circuit which may be employed in the present invention.

Referring to FIGURES 4 and 5, it will now be assumed that the proper station or sign has been "selected" as described above and that the relay 92 is operative to furnish a ground connection to a terminal 134 through contact arm 93 and contact 95 as previously indicated. The terminal 134 (FIGURE 4) is connected to a terminal 136 (FIGURE 5). The terminal 136 is therefore connected to ground when the "selected" station is adapted to receive the coded signal to control a function or to change a sign indication.

A source of B+ is applied to one side of a relay 138, and when the terminal 136 is returned to ground the relay operates. Contact arm 140 closes and contact arm 142 opens when the relay 138 is operated. The opening of the contact arm 142 disconnects a ground connection from the relays 144, 146, 148, 150 and 152 to open interlock circuits associated therewith, as will be described. Disconnection of the interlock circuits adapts the relays 144, 146, 148, 150 and 152 to be responsive to the next coded signal transmitted to vary a function or indication on a sign. The particular indication changed is dependent upon which one or ones of the relays are actuated.

After the relay 138 has made the circuit responsive to the next received coded signal, it is made inoperative. The contact arm 140 provides a ground to a source of B+ potential through relay 154 to cause a relay 154 to become operative. Operation of relay 154 closes the contact arm 156 and opens the contact arm 158. Opening the contact arm 158 removes the ground return for the relay 138 through the terminals 136 and 134, causing it to become inoperative. The contact arm 142 returns to ground when the relay 138 becomes inoperative to permit interlocking of a chosen relay or relays of the relays 144, 146, 148, 150 and 152, as will be described.

Closing of the contact arm 156 provides a ground return for the relay 154 through the terminals 136 and 134 to provide interlocking means for the relay 154. The relay 154 remains operative until the terminal 136 is disconnected from ground, which occurs when the relay 92 (FIGURE 4) becomes inoperative at the completion of the dialing operation.

In FIGURE 5, five input terminals, 164, 165, 166, 167 and 168 are connected to the terminals 114, 115, 116, 117 and 118, respectively (FIGURE 4). Only five terminals are shown, for purposes of clarification, it being understood that more or less terminals and associated relay could be used, dependent upon the requirements of a particular system.

It has been seen that when a digit or coded signal to control a function or sign indication is received, the stepping relay 110 (FIGURE 4) will step in accordance with the dialed digit received. The arm 104 stops at one of the contacts connected to one of the terminals 114 to 118 dependent upon the digit received, and when relay 98 releases this contact will be supplied with a ground connection.

When one of the terminals 164 to 168 is connected to ground through one of the terminals 114 to 118, one of the relays 144, 146, 148, 150 or 152 will become operative. One of the contact arms 170, 172, 174, 176 or 178 is closed dependent upon which of the relays is operated. Closing of the contact arms 170, 172, 174, 176 or 178 provides a ground return for one of the terminals 180 to 184. The connection of one of the terminals 180 to 184 to ground may be included in the circuitry to control a particular indication on a sign, such as the sign 29 illustrated in FIGURE 1. Closing of one of contact arms 186 to 190 provides means for interlocking the particular relay chosen. The inter-locking is provided by connecting a source of B+ through one of the relays 144, 146, 148, 150 or 152, through one of the contact arms 186 to 190, through the contact arm 142 to ground.

In considering the operation of a system embodying the circuitry shown, assume first that the proper station has been selected and a signal corresponding to the digit "4" is received to change a particular function or sign indication. The arm 104 (FIGURE 4), in this case, stops at a contact which is electrically connected to the terminal 116 and through the contact arms 93, 95 and 124 to ground. The terminal 166 (FIGURE 5), since it is connected to the terminal 116 (FIGURE 4), is therefore connected to ground under these conditions. The source of B+ is connected to the relay 148 closing its contact arm 188 to provide means for interlocking the relay 148 since B+ is then applied through the relay 148, the contact arm 188, the contact arm 142 to ground.

If the transmission of the digit "4" relates to "rain," for example, the relay 148 may be associated with various other circuitry or adapted to actuate a motor which will cause rotation of a mechanical sign, such as the sign 29 (FIGURE 1), or the one shown and to be described in connection with FIGURE 6, to change one of its indications "snow" previously present for instance to an indication "rain," for example. Other indications relating to "Danger" may be changed to "Safe," the speed limit "35 m.p.h." may be changed to "50 m.p.h.," or numerous other types of indications may be changed dependent upon the coded signals transmitted from the transmitter 14 (FIGURE 1) to a R.F. receiver 22 (FIGURE 1).

Figure 6:
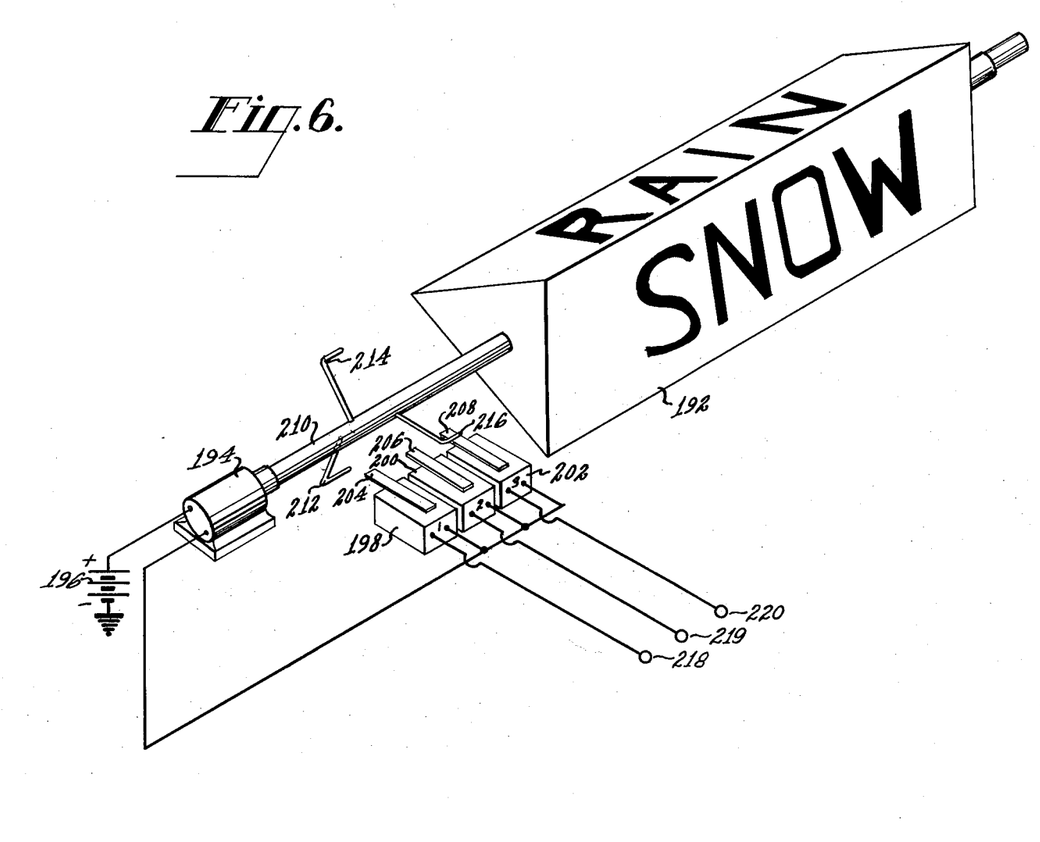
FIGURE 6 is an illustration of a portion of an indicating sign which may be employed in practicing the present invention; and, FIGURE 7 is a schematic diagram illustrating a portion of a decoding or selection circuit which may be used with the present invention.

Referring particularly to FIGURE 6, a triangular or three section sign 192, such as may be included in the road condition indicating sign 29 (FIGURE 1), is adapted to be rotated when a motor 194 is energized from a source of potential such as a battery 196. Three microswitches or limit switches 198, 200 and 202 are normally closed and are adapted to be opened when their respective springs 204, 206 and 208 are urged in a downward direction. A shaft 210, which rotates during the operation of the motor 194, includes three actuating arms 212, 214 and 216 positioned to physically engage the springs 204, 206 and 208, respectively, during rotation of the shaft 210. The motor 194 operates when one of three terminals 218, 219 or 220 is connected to ground and the respective micro-switch 198, 200 or 202 to which the one terminal is connected is closed.

For purposes of explanation, it may be assumed that the terminals 218, 219 and 220 are connected to terminals 180, 181 and 182, respectively, of FIGURE 5. When one of the relays 144, 146 or 148 is operated, dependent upon the digit received to change the sign indication, one of the arms 170, 172, or 174 will be closed to connect one of the terminals 180, 181 or 182 to ground. Under these conditions, the motor 194 will be operated since current from the battery 196 flows through the motor, one of the switches 198, 200 or 202 and to one of the terminals 218, 219 or 220 which is eventually returned to ground. The motor continues to operate until one of the arms 212, 214 or 216 is urged against the spring member 204, 206, or 208 which is associated with the terminals 218, 219 or 220 which is returned to ground. For example, if the contact 220 is grounded the motor 194 will turn the shaft 210 until the arm 216 engages the spring 208 thereby opening the switch 202. When the appropriate micro-switch is opened by the arm urged against its spring, the motor 194 becomes inoperative and the sign 192 will be positioned to indicate an appropriate road or weather condition such as snow, rain, sleet, etc.

Figure 7:
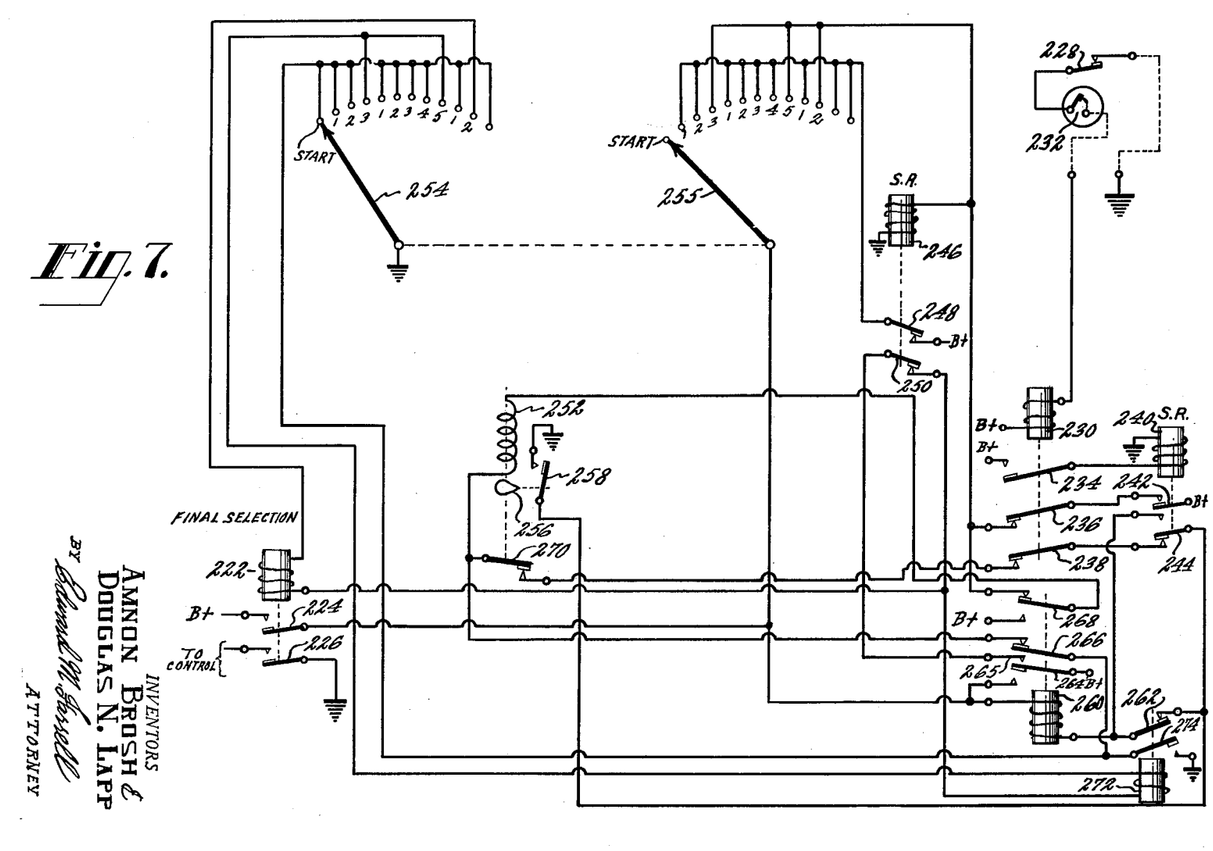

Referring particularly to FIGURE 7, there is illustrated an electrical selection unit, which may comprise the selection unit 88 mentioned in connection with FIGURE 4.

In considering the operation of this circuit, assume that a particular receiving station is assigned a code number "352." When these three digits are received, it is desired to operate a relay 222 which will cause the contact arms 224 and 226 to close. The contact arm 226 may be considered as performing the same function as the contact 90 shown in FIGURE 4. If a number other than "352" is dialed, the relay 222 will remain inoperative, and subsequent dialed digits to control indications on a sign are uneffective.

When a master switch is on, such as when a mouthpiece is off its cradle at a transmitting station, a relay 230 becomes operative by a current flow through its coil from a source of B+ potential, a dial switch 232, the master switch 228 to ground. When the relay 230 is operated, a contact arm 234 closes, and contact arms 236 and 238 open. When the relay 230 is operative, a relay 240 becomes operative since a source of B+ potential is applied through the contact arm 234, through the coil of the relay to ground. Operation of the relay 240 causes contacts 242 and 244 to close. The relay 240 may be of the slow release type.

When a digit is dialed, the switch 232 is caused to open in pulses, thereby causing the relay 230 to open in pulses. The relay 230 operates in a manner similar to the relay 78 illustrated in FIGURE 4. There may be various circuits within a receiving station where the relay 230 may be included to achieve the desired operation. During a dialing operation, a relay 246 of the slow release type becomes operative since a source of B+ potential is applied through the contact arm 242, the contact arm 238, through the coil of the relay 246 to ground. Operation of the relay 246 causes the contact arms 248 and 250 to open. During the dialing operation, a stepping coil 252 causes stepper arms 254 and 255 to step in accordance with the opening of the relay 230. When the stepper arms 254 and 255 leave the terminals marked "start," a cam member 256 is positioned to close a contact arm 258. The contact arm 258 remains closed until the arms 254 and 255 return again to the "start" positions. The stepping action by the coil 252 is caused since B+ is applied to the coil through the contact arms 242, 236, 268 and ground is applied to the coil 252 through the contact arm 266 and the stepping arm 254.

In considering the operation of the circuit shown, we will first consider that the station to be selected is not "352." The first dialed digits in the case may be greater or lesser than "3." If the first digit dialed is less than "3," the station having the code number "352" should be non-responsive.

When a number less than "3" is first dialed, the dialing operation stops at 1 or 2 stopping the stepping arms 254 and 255 at the terminals marked "1" or "2." At this point, after a short delay, the relay 246 opens since the relay 230 is operative to open the contact arm 236 disconnecting the source of B+ from the relay 246. A source of B+ potential is applied through the contact arm 248, through the terminal at which the stepper arm 255 stopped, through the stepper arm 255, through the coil of a relay 260, through the contact arms 258 and 262 to ground. The relay 260 thus becomes operative to actuate contact arms 264, 266 and 268. The contact 264 is connected to a source of B+ potential which is applied to the coil of the relay 260 to provide inter-locking means.

When the contact arm 268 is actuated, the stepping coil 252 is disconnected from the contact arms 236 and 242. A source of B+ is supplied to the stepping coil 252 directly from the contact arm 268 when it is actuated. Actuation of the contact arm 266 removes a continuous ground connection for the stepping coil 252 through the stepping arm 254.

When a second digit is dialed, the stepping coil 252 will not be affected since no ground return is provided for its coil. Under these conditions, operation of the relays 230, 240 and 246 does not affect the operation of the stepping coil 252 when a second digit is dialed. Subsequent dialed digits will likewise not affect the operation of the stepping coil 252. Since the station numbered "352" was not selected, subsequent signals relating to changing functions or indications on a sign will not be effective. For example, the contact 226 which may perform a function similar to the contact 90 illustrated in FIGURE 4 will not close and road conditions indications for the station number "352" will remain the same as before the dialing operation.

Since the proper station numbered "352" was not selected, means are provided to return the circuitry to its normal inoperative conditions after the complete dialing operation relating to the "selection" and "control functions" cease. After the complete dialing operation, the contact arm 228 is opened (or no signal is transmitted from a transmitting station) and the relay 230 becomes inoperative. The contact arm 234 opens to disconnect the relay 240 from the source of B+ making it inoperative after a short delay.

A source of B+ is connected from the contact arm 268, through the stepping coil 252, through contact arms 270, 238, 244 and 258 to ground. The contact arm 270 opens for each stepping operation. The stepping operation is performed by the stepping coil 252 by moving the arms 254 and 255 each time the coil 252 is energized. Energization of the coil 252 causes the contact arm 270 to open in steps. The closing in steps of the contact arm 270 will cause the stepping arms 254 and 255 to "home" when a digit other than "3" is dialed first. The stepping coil 252 is operative or "homed" until the stepper arms 254 and 255 reach their respective "start" terminals. At this point, the cam member 256 engages the contact arm 258 causing it to open and the stepping coil 252 to stop stepping at this point. When the contact arm 258 opens, the ground return for the relay 260 through the contact arm 262 is removed. The interlocking means for the relay 260 thereby becomes inoperative causing the relay 260 to become inoperative. The circuit of FIGURE 7 is now back to the same condition as it was prior to the commencement of the dialing operation. It is noted that the contact arm 226 did not close, since the proper selection signal was not received.

Let us now assume that the first digit dialed is greater than "3." The initial circuit operation is similar to the operation described in connection with the dialing of a digit less than "3." The switch 228 is closed. The relays 230 and 240 become operative. When the digit is dialed, the relay 230 opens in pulses and the relay 246 becomes operative. The stepping coil 252 steps in accordance with the digit dialed and the contact 258 closes after the stepper arms 254 and 255 leave the "start" terminals.

When the stepper arm reaches "3," the stepping coil 252 discontinues stepping since no ground return is provided through the stepper arm 254 when this arm is at position "3." As the dialing operation continues beyond "3" the stepping coil 252 remains inoperative. B+ potential is applied to the relay 260 through the contact arms 242, 236 and the stepper arm 255 with ground being connected to the relay 230 through the contact arms 262 and 258. The relay 260 then locks itself after the initial operation since B+ potential is applied to the contact arm 264 with ground still being connected to the relay 260 through the contact arms 262 and 258. Further, dialing does not affect the system since the contact arm 268 opens to disconnect the source of B+ potential from the stepping coil 252.

After the completion of the transmission, or when the master switch 228 is opened, the relays 230, 240 and 246 becomes inoperative and the "homing" circuit becomes operative. B+ potential is applied to the stepping coil 252 through the contact arm 268 and ground is connected to the stepping coil 260 through the contact arms 270, 238, 244 and 258 during the "homing" operation. Again the "homing" operation ceases when the stepper arms 254 and 255 reach the "start terminals" and the contact arm 258 opens.

If the first digit dialed is "3" in the circuit shown and the second digit dialed is greater than "5," the stepper arms will step to "5" and then remain there. The operation of the circuit will be the same as that described when the first digit was greater than "3." If the second digit dialed is less than "5" the operation of the circuit shown will be similar to the operation described when the first dialed digit was less than "3."

If the first two digits dialed are "3" and "5" in that order and the third dialed digit is either more or less than "2," the operation of the circuit shown will be the same as that described when the first dialed digit was less than "3."

Let us now assume that the station numbered "352" is desired to be selected and that therefore the first dialed digit received is the digit "3." The preliminary operations are similar to those previously described in connection with digits dialed which were less than "3." The relay 230 and 240 becomes operative. When the digit "3" is dialed, the relay 230 opens in pulses and the relay 246 closes through the contact arms 236 and 242. The stepping coil 252 is operated in steps since B+ is supplied through the contact arms 268, 236 and 242 with ground being provided to the stepping coil 252 through the contact arm 266 and the stepper arm 254 which is grounded. Again, the contact arm 258 is closed when the stepper arms 254 and 255 leave their "start" terminals.

After "3" is dialed the relay 264 opens after a short delay, since no B+ is applied thereto through the contact arm 236. When the contact arm 254 stops at the terminal numbered "3" and the relay 246 is open, a source of ground is connected to a relay 272 through the arm 254. A source of B+ potential is applied to the relay 272 through the contact arms 250 and 265. Operation of the relay 272 causes contact arms 262 and 274 to be actuated. The circuit remains in this operating condition until a second digit is dialed.

When the second digit is dialed, the relay 230 opens in pulses. The stepping coil 252 is actuated for a step since B+ is applied thereto through the contact arms 242, 236 and 268 and ground is connected to the coil through the contact arms 266 and 274. After one step, the contact arm 250 opens, making the relay 272 inoperative. The stepping coil 252 continues to be operated in steps since B+ is applied through the contact arms 242, 236, 268 through the coil, the contact arms 270, 238, 244, and 258 to ground.

If the second digit dialed is "5," the operation of the circuits shown is similar to the operation described when "3" was dialed as the first digit. If the second digit dialed is less than "5," the operation of the circuit will be similar to that described when a digit first dialed was less than "3." If the second digit dialed is more than "5" the operation of the circuit will be the same as that as when the first digit dialed is more than "3." This latter operation will be described hereinafter.

When the coded station numbered "352" is dialed, assume that the digit "2" is dialed as the third digit after the dialing of the first two digits "3" and "5". The stepping arms 254 and 255 will be stepped by the stepping coil 252 in the manner previously described and the arms 254 and 255 will be positioned at the final terminals marked "2." At this point, the relay 246 opens and the relay 222 is made operative. Ground is connected to the relay 222 through the stepper arm 254 and B+ is applied thereto through the contact arms 250 and 265. Operation of the relay 222 causes the contact arms 224 and 226 to close. Closing of the contact 226 may cause operation of appropriate circuitry to alert or otherwise affect subsequent operations of a road condition sign, for example. As pointed out previously, closing of the contact arm 226 may perform the same function as a closing of the contact 90 illustrated in FIGURE 4.

When the contact arm 224 closes, B+ is applied to operate the relay 260 through the contact arms 262 and 258 to ground. The circuit is in this operating condition until a particular transmission is ended or until the master switch 228 is opened, such as by "hanging up" a telephone mouthpiece.

When the master switch 228 is opened, the relays 230, 240 and 246 become inoperative and a "homing" circuit becomes operative to bring the stepper arms 254 and 255 to their respective "start" terminals. The stepping coil 252 is operated since B+ is applied thereto through the contact arm 268 and ground is provided through the contact arms 270, 238, 244 and 258. Operation of the stepping coil 252 causes the contact arm 270 to open in steps. When the stepping arms 254 and 255 have reached their "start" positions, the cam member 256 will cause the contact arm 258 to open thereby removing the ground connection from the stepping coil 252 and preventing any further stepping operation. The circuit shown will remain in this condition until the next transmission or until the master switch 228 is closed.

It has been seen that the present invention has provided an improved remote control system. The remote control system described has included a relatively simple means for selecting one of a plurality of receiving stations. When the proper station has been selected, a relatively simple means is employed to control certain functions associated with the selected station. The present invention is especially useful in systems involving a plurality of road conditions indicating signs, where the road conditions are frequently subject to change and where it is desired to effectuate changes on the sign by a coded signal from a touring police car. Also, directions or other information for touring motorists could be included on the signs involved. The use of a dial at the transmitter provides a convenient way of producing the coded signals involved to change the sign indications.

What is claimed is:

In a traffic directing system including a plurality of highway signs for indicating driving conditions, speed limits and weather conditions comprising a low frequency generator, dialing means associated with said low frequency generator to produce a coded signal therefrom for selection of one of said plurality of highway signs and to vary the indications thereon, a transmitter for transmitting radio signals, means for modulating said radio signals with said coded signal, a receiving station for receiving said radio signals associated with each of said plurality of highway signs, means including a low frequency receiver in each receiving station for abstracting said coded signal from said radio signals, a multi-function decoder adapted to be responsive to one type of coded signal and being non-responsive to other types of coded signals, said multi-function decoder including a stepping relay for converting said coded signals into control functions when said multi-function decoder is responsive to said coded signal, means for applying said abstracted coded signal from said low frequency receiver to said multi-function decoder, a control circuit including a plurality of relay devices to receive said control functions when said multi-function decoder is responsive to said coded signal, and a plurality of triangular signs having various indications for indicating driving conditions, speed limits and weather conditions adapted to be actuated by said control circuit, the indications of said plurality of signs being variable in accordance with the control functions applied to said control circuit.

References Cited in the file of this patent

UNITED STATES PATENTS

| | | |
|---|---|---|
| 1,055,929 | Long | Mar. 11, 1913 |
| 1,849,870 | Fitzgerald | Mar. 15, 1932 |
| 1,900,499 | Hershey | Mar. 7, 1933 |
| 1,932,925 | Chauveau | Oct. 31, 1933 |
| 2,203,871 | Koch | June 11, 1940 |
| 2,295,442 | Wilhelm | Sept. 3, 1942 |
| 2,297,618 | Grimes et al. | Sept. 29, 1942 |
| 2,595,614 | Stickel | May 6, 1952 |
| 2,612,710 | Fuller | Oct. 7, 1952 |
| 2,735,083 | Finley | Feb. 14, 1956 |
| 2,832,060 | Hendricks et al. | Apr. 22, 1958 |
| 2,877,444 | Hawley | Mar. 10, 1959 |